US009888346B2

(12) United States Patent
Rabinowitz et al.

(10) Patent No.: US 9,888,346 B2
(45) Date of Patent: Feb. 6, 2018

(54) POWER MANAGEMENT SYSTEM FOR ACCESS CONTROL DEVICES

(71) Applicant: HYATT CORPORATION, Chicago, IL (US)

(72) Inventors: Armand Rabinowitz, Riverwoods, IL (US); Brett Cowell, Lisie, IL (US)

(73) Assignee: Hyatt Corporation, Chicago, IL (US)

( * ) Notice: Subject to any disclaimer, the term of this patent is extended or adjusted under 35 U.S.C. 154(b) by 0 days.

(21) Appl. No.: 15/266,577

(22) Filed: Sep. 15, 2016

(65) Prior Publication Data
US 2017/0086019 A1 Mar. 23, 2017

Related U.S. Application Data

(60) Provisional application No. 62/220,499, filed on Sep. 18, 2015.

(51) Int. Cl.
H04W 24/00 (2009.01)
H04W 4/02 (2009.01)
H04W 12/08 (2009.01)

(52) U.S. Cl.
CPC .......... *H04W 4/021* (2013.01); *H04W 4/025* (2013.01); *H04W 12/08* (2013.01)

(58) Field of Classification Search
CPC ...... H04W 4/021; H04W 4/025; H04W 12/08
USPC ................. 455/456.1–456.3, 404.2
See application file for complete search history.

(56) References Cited

U.S. PATENT DOCUMENTS

| 2012/0289178 | A1* | 11/2012 | Matsumura | H04W 52/0206 455/403 |
| 2015/0156031 | A1* | 6/2015 | Fadell | H04L 12/2816 700/276 |
| 2016/0073264 | A1* | 3/2016 | Van den Broeck | H04W 4/021 455/411 |
| 2017/0061442 | A1* | 3/2017 | Barlow | G06Q 30/016 |

OTHER PUBLICATIONS

Erik Dahlgren et al., "Evaluation of indoor positioning based on Bluetooth Smart technology," Chalmers University of Technology, Department of Computer Science and Engineering (Jun. 2014).
AMX LLC, "ZigBee White Paper" (2006).
Jimmy Lamance et al., "Assisted GPS—A Low-Infrastructure Approach," GPS World, Innovation, pp. 46-51 (Mar. 2002).
Hagop Araklian, "Indoor & Outdoor location sensing" (2007).
Broadcom Corporation, "White Paper—Secure User Plane Location" (Oct. 2007).

* cited by examiner

*Primary Examiner* — Wayne Cai
(74) *Attorney, Agent, or Firm* — Baker & Hostetler LLP

(57) ABSTRACT

Managing an access device associated with a controlled area at a place of hospitality is described. A location of a device of a user is determined. A controlled area that the user is authorized to access is determined. The location of the device of the user is monitored, and when the location of the device of the user is within a first area proximate to the controlled area, a first signal is transmitted to an access device associated with the controlled area. The first signal is used to manage an operation of the access device. An additional location of the device of the user may be determined. When the additional location of the device of the user is within a second area proximate to the controlled area, a second signal used to enable access to the controlled area is transmitted to the access device.

19 Claims, 11 Drawing Sheets

POWER MANAGEMENT SYSTEM FOR ACCESS CONTROL DEVICES

CROSS-REFERENCE TO RELATED APPLICATIONS

This application claims priority to U.S. Provisional Patent App. No. 62/220,499, filed Sep. 18, 2015, the disclosure of which is hereby incorporated by reference in its entirety.

TECHNICAL FIELD

This disclosure generally relates to power management for access control devices. More particularly, this disclosure relates to systems and methods for configuring access control devices to provide access to controlled areas when users having authorization to access the controlled areas are proximate to the access control devices.

BACKGROUND

Places of hospitality such as hotels, resorts, and parks provide guests with a number of services. In order to control access to certain services, these places may use locks and other types of access devices to secure the services. For example, a room that is reserved for a guest may be secured using an electronic lock, and only the guest that is authorized access to the room may have a key that opens the lock. Other examples of secured or controlled areas may include a gated parking structure or a VIP club.

Typically, guests with authorization to access a controlled area of a place of hospitality are required to obtain an access key, such as a magnetic card, for unlocking an access control point (ACP). For different controlled areas such as a room and a fitness center, guests may also need to obtain more than one access key. With multiple keys, it may be difficult for guests to locate the right key for unlocking a particular ACP. Guests may also lose track of keys and have to obtain new keys to access a controlled area.

Many access keys also need to be placed in close proximity or within ACPs in order to unlock the ACP. For example, a magnetic stripe card key may need to be swiped by a guest through a card reader on an ACP in order to unlock the ACP. For guests carrying loads, having to set down the load in order to find the right access key to unlock an ACP may be inconvenient and time-consuming. Many guests may also carry an access key in a purse or briefcase and have to spend time locating the access key in their purse or briefcase in order to unlock an ACP.

Guests may also encounter delays and congestion in obtaining their access keys. Guests typically pick up their access keys from a front desk of a hospitality establishment. Oftentimes, however, the lines before front desks are long due to the number of guests staying at these establishments. Guests that misplace keys may also have to return to the front desk multiple times in order to obtain new access keys. Access keys such as magnetic cards may also lose their data when placed near a mobile device such as a cell phone, which may necessitate another visit to the front desk.

Moreover, ACPs at places of hospitality are typically set to operate in a static sleep/wake power cycle. Because most ACPs are powered by batteries, the sleep/wake cycle of the ACP is designed to maximize the period of time that a set of batteries would last. Specifically, the ACP may be set to operate in a sleep mode for static time increments and to wake periodically to check for control messages from an external source (e.g., an upstream control point or a lock server). In its sleep mode, the ACP cuts power to any unneeded components, thereby conserving power. But the ACP in the sleep mode may not respond to signal from an external source. As a result, with a static sleep/wake schedule, if an unlock message is sent to a specific ACP when it is in sleep mode, then the ACP may not respond to the unlock message and provide access to a controlled area until it cycles into its wake mode. This may cause guests to wait for a longer period of time (i.e., wait until the ACP is in wake mode) in order to gain entry into the controlled area. While a solution to this problem may be to always operate the ACPs in a wake mode, such a solution reduces energy efficiency and may pose an inconvenience to guests and hospitality staff if the ACPs require constant battery changes.

SUMMARY

In an aspect, a method for managing access devices at a place of hospitality may include: determining a location of a device of a user; determining that the user is authorized access to a controlled area; determining when the location of the device of the user is within an area proximate to the controlled area; and transmitting a signal to an access device associated with the controlled area when the location of the device of the user is within the area proximate to the controlled area, the signal used to manage an operation of the access device.

In another aspect, a device for providing access to a controlled area at a place of hospitality may include a processor. The device may also include a memory storing instructions that, when executed, cause the processor to: determine a location of a device of a user, wherein the user is authorized access to the controlled area; determine when the location of the device of the user is within an area proximate to the controlled area, the location determined based on at least location information of the device; and transmit a signal to an access device associated with the controlled area when the location of the device is within the area proximate to the controlled area, the signal used to enable access to the controlled area.

In another aspect, a system for providing access to a controlled area at a place of hospitality may include an access device configured to provide access to the controlled area. The system may also include an access device management system comprising a processor and configured to: determine, using the processor, a first location of a user device of a user; determine, using the processor, that the user is authorized access to the controlled area; determine, using the processor, when the first location of the user device is within a first area proximate to the controlled area; and transmit a first signal to the access device when the first location of the user device is within the first area proximate to the controlled area, the first signal used to manage an operation of the access device. The system may also include the user device configured to transmit a second signal to the access device when a second location of the user device is within a second area proximate to the controlled area, the second signal used to enable access to the controlled area.

BRIEF DESCRIPTION OF THE DRAWINGS

In order that the disclosure may be readily understood, aspects of the disclosure are illustrated by way of examples in the accompanying drawings, in which like reference numerals refer to like elements throughout.

DETAILED DESCRIPTION

Figure 1:
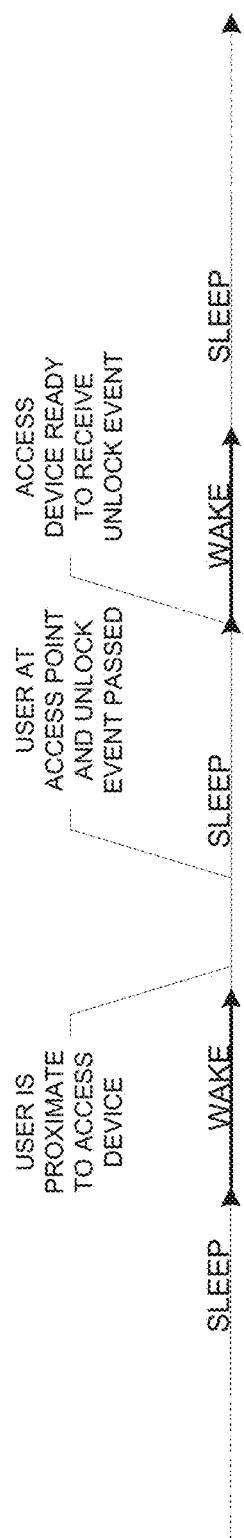
FIG. 1 illustrates an example static sleep/wake cycle of an access device for providing access to a controlled area at a place of hospitality.

Hotels and other places of hospitality may control guest access to certain locations (e.g., guest rooms, fitness center, parking lot). Guests that have reservations at a hotel may be authorized based on their reservation to access a limited number of controlled locations. For example, a guest with a room reservation at a hotel may be authorized to access a particular room of the hotel. The room reservation may also authorize the guest to have access to other controlled locations around the hotel such as a fitness center, a parking lot, a VIP room, or the like.

A hotel may use access devices (e.g., ACPs) to control access to various locations. For example, a hotel may use an access device such as an electronic lock to control access to a guest room. The access devices may provide access to a controlled location when they are presented an access key. Upon check-in at a hotel, guests may be issued an access card (e.g., radio-frequency identification (RFID) card or a magnetic strip card) containing the access key that can be used to unlock certain access devices around the hotel. The guest may be required to place the card in close proximity or within an access device in order to unlock the access device. For example, a guest that is issued a RFID card for gaining access to a room may need to swipe the card through a card reader of an access device on a door of the room in order to trigger the access device to unlock.

Systems and methods disclosed herein may automatically enable access to controlled locations of a hotel or other place of hospitality using access devices or end points that are connected to a network (e.g., online). Such systems and methods may use various positioning methods (e.g., control plane locating, Global Positioning Services (GPS), assisted GPS, Global Navigation Satellite System (GNSS), Wireless Fidelity (Wi-Fi) positioning, Bluetooth positioning, infrared-based proximity positioning, and other indoor positioning services) in conjunction with a mobile device of a guest (e.g., a smart phone) to determine with high fidelity the location of guests within the hotel.

According to an example, a GNSS may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a GPS, Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Systems and methods disclosed herein may determine when a guest authorized to access a controlled location is approaching or proximate to the controlled location and issue an unlock control message to the access device for that controlled location. Generally, many access devices installed on door or other access points may be online or offline. When an access device is offline, the access device is not connected in any manner to a control network. When an access device is online, the access device may be connected to a control network, which may communicate with the access device during enhanced operations, administration, and maintenance (OA & M) processes. The control network may run from a control point to intermediate and/or central servers to the access device. The control network may be any type of network such as a personal area network (PAN), local area network (LAN), wide area network (WAN), home area network (HAN), etc. In particular, the control network may be a PAN such as a Zigbee network.

Access devices at hotels are typically powered by one or more batteries. These batteries may be depleted based on the use of the access devices. When the access devices are in a full power or ready mode, the access devices may consume more battery power. And when the access devices are in a sleep or low power mode, the access devices may consume less battery power. In order to maximize battery life, many device providers implement a sleep/wake cycle power management scheme where the access device may operate in a sleep mode with close to zero power consumption for static time increments and wakes periodically to check for control messages and events, such as a control message or event from an upstream control point or server (e.g., a lock server housed in a central location at an on-site or remote facility). Such an approach may be typical for managing power consumption of battery-operated end points of any kind on a large, industrial network such as, for example, a supervisory control and data acquisition (SCADA) network.

Systems and methods disclosed herein may provide an alternative method of managing power consumption by access devices. Systems and methods disclosed herein may operate by sending one or more control messages to an access device. In particular, systems and methods disclosed herein may send a control message to an access device when a guest authorized with accessing a controlled area beyond the access device is approaching or proximate to the access device. With conventional methods, the access device may be set to operate in a static sleep/wake cycle. When the access device is operating in a wake mode and receives the control message, the access device may permit access to the controlled location, for example, by unlocking. But when the access device is operating in a sleep mode, the access device may not respond to receiving the control message until it switches into the wake mode. Thus, with a static sleep/wake cycle, such as that depicted in FIG. 1, if the control message (e.g., an unlock event) is sent when the access device is in the sleep mode, then the access device may not respond right away. Instead, the access device may not be ready to receive a control message until a period of time after the control message is originally sent. As a result, a guest that arrives at the access device when the access device is in the sleep mode may have to wait until the access device cycles into the wake mode in order to gain entry to the controlled area.

In order to avoid this problem, systems and methods disclosed herein may implement power management schemes for access devices with a dynamic sleep/wake cycle. Specifically, such systems and methods may monitor the movements of a guest that is authorized to access a controlled location (e.g., a guest room) using conventional location-based technology (e.g., GPS, GNSS, Wi-Fi positioning, cell tower triangulation, proximity sensors). Such systems and methods may determine when the guest is approaching the controlled location and pass a control message in advance of his approach to the particular access device for the controlled location. The control message may instruct the particular access device to operate in a wake mode. Thus, when the guest is proximate to the access device and an additional control message to unlock is sent to the access device, the access device is ready to receive and respond to the additional control message. By configuring the access device to operate in a dynamic sleep/wake cycle that is dependent on a guest's location, systems and methods disclosed herein may increase energy efficiency and reduce the costs associated with replacing the batteries (or other power sources) of access devices. Specifically, such systems and method may minimize the amount of time that an access device is not needed to operate in a ready or high power mode.

Figure 2:
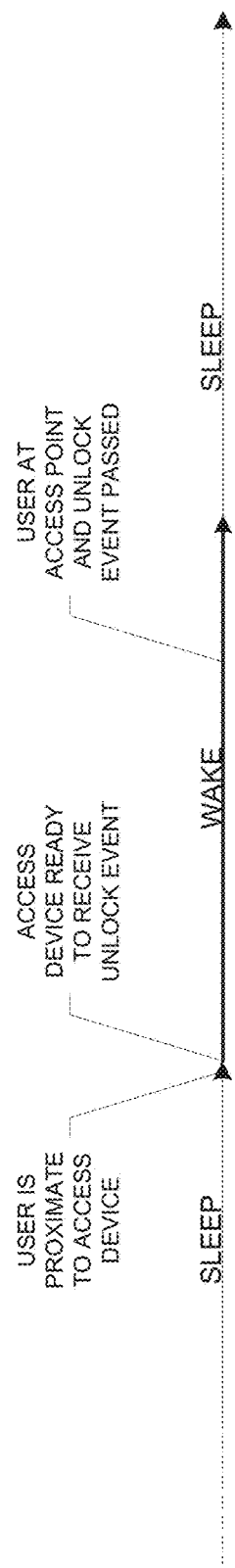
FIG. 2 illustrates an example dynamic sleep/wake cycle of an access device providing access to a controlled area at a place of hospitality.

An example of a dynamic sleep/wake cycle for an access device is depicted in FIG. 2. The access device initially may be operating in a sleep mode. When a user is proximate to the access device (e.g., when the user enters the hallway with the access device), a first control message may be sent to the access device. This first control message may instruct the access device to switch to a wake mode. In the wake mode, the access device may be ready to receive an unlock event. Then, when the user arrives at the access point and a second control message including the unlock event is sent to the access device, the access device may respond right away to the unlock event and provide access to a controlled area beyond the access device.

In systems and methods disclosed herein, a guest staying at a hotel may install an application with a virtual guest key (VGK) on a mobile device (e.g., a smart phone). The application may be used by the guest to function as an access key for a guest room door or other access point during his stay at the hotel. The application may provide access to a controlled area with an online access device. In certain aspects, the application may also allow other functions such as, for example, locking the access device, getting a current status (e.g., locked, unlocked, operating in sleep or wake mode) of the access device, etc.

When the guest arrives at a hotel, the mobile device of the guest may be provisioned with the VGK. Use of the VGK may be constrained to the period of time that the guest will be staying at the hotel (e.g., a reservation period) and the access devices to which the guest may have access rights. For instance, the VGK may be limited to unlocking only those access devices that provide access to controlled areas that the guest has authorization to access. This may include, for example, an access device to a guest room, an access device to a parking garage gate, an access device to a hotel club, an access device to a fitness center, etc. Once the VGK is provisioned, a guest that approaches a controlled area that he is authorized to access may use the VGK to gain access to the controlled area. For example, a guest who exits an elevator on a floor of a hotel with his assigned room may use the authorized and credentialed VGK stored in his mobile device to unlock a door to his room.

Systems and methods disclosed herein may function in an automatic manner or in manner requiring user input. For example, a guest that is approaching an access device may select an "unlock" button in a user interface of an application to have a control message get sent to the access device. Alternatively, a guest may preset an application on his mobile device to an auto unlock state where a control message is sent automatically to an access device when the guest approaches the access device. In such systems and methods, the control message may be sent to an access device over public and private networks.

Systems and method disclosed herein may provide access to a controlled location of a hospitality establishment without the use of a key card, thereby reducing an amount of time that guests may need to spend checking-in at an establishment to obtain key cards and the cost of acquiring and implementing the key cards. Systems and methods disclosed herein may also provide guests with access to a controlled location without requiring the guests to place a key card or other access key in close proximity or within an access device. Indeed, such systems and methods may automatically unlock an access point to a controlled area when a guest is within a sufficient distance from the controlled area.

Systems and methods disclosed herein may use a combination of location-based services and proximity sensors in conjunction with the operating systems and hardware capabilities and sensors of user devices to detect a position of a guest as he approaches a controlled location such as a guest room. When such systems and methods determine that a guest is approaching a controlled location, such systems and methods may pass a control message at an appropriate time in advance of the approach of the guest to an access device for the controlled location so that the access device operates in a wake mode. Then, when the guest is proximate to the access device, the guest may gain quick access to the controlled area. As such, the response time for gaining access to the controlled area may be comparable or faster than existing access systems.

Systems and methods disclosed herein may also detect when a guest is not proximate to a controlled area. During these periods, such systems and methods may pass a control message to the access device to operate in a sleep mode for a longer period of time in order to conserve battery life.

Figure 3:
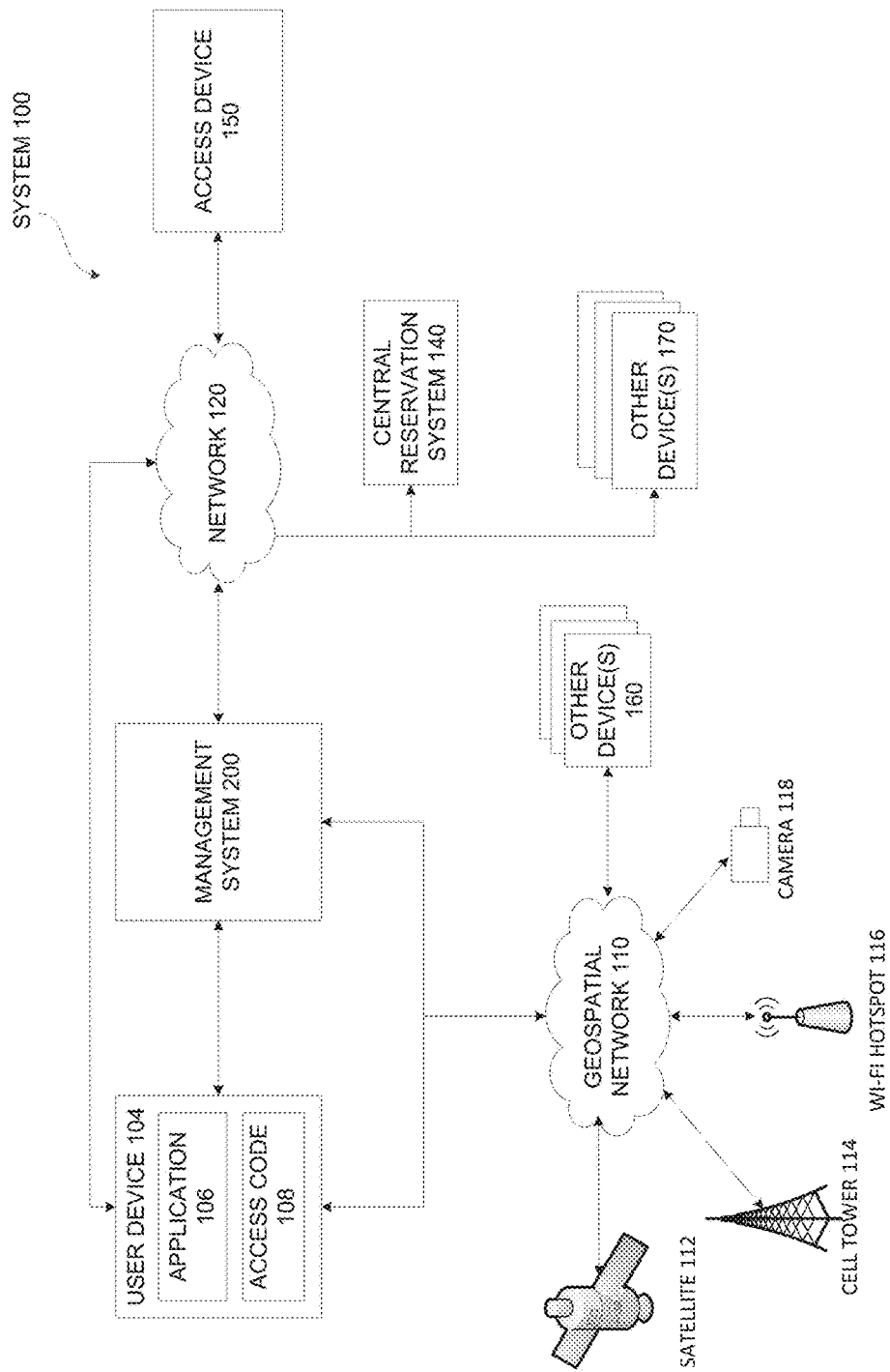
FIG. 3 illustrates a block diagram of an example framework for providing access to a controlled area at a place of hospitality according to certain aspects of the disclosure.

Referring now to FIG. 3, an example framework for providing access to a controlled area at a place of hospitality is described. As depicted, a system 100 for providing access to a controlled area may include a user device 104. The user device 104 may be a cellphone, a wireless phone, a smart phone, a tablet, an electronic organizer, a pager, or other network device. The user device 104 may be connected to a management system 200, one or more networks (e.g., a geospatial network 110, a network 120), and additional device(s) 160, 170 via the one or more networks. The user device 104 may include an application 106 and an access code 108. The application 106 and the access code 108 may be stored in a memory (not depicted) of the user device 104. The application 106 may be a software application having a user interface. The application 106 may be configured to run on the user device 104. The application may store one or more settings associated with unlocking one or more access devices (e.g., access device 150). Specifically, the application may store settings indicating when a control message for unlocking an access device is to be sent to the access device. As an example, the application may store a setting indicating that a control message for unlocking an access device should be sent to the access device when a location of the user device 104 is less than a predefined distance away from the access device. As another example, the application may store a setting indicating that a control message for unlocking an access device should be sent to the access device when a user provides a specific input into the user device 104.

The access code 108 may be a key that is configured to unlock one or more access devices (e.g., access device 150). In particular, the access code 108 may be a VGK. The access code 108 may include a string of alphanumeric characters. The access code may be dynamic (e.g., for one time use and to change thereafter) or static. The access code 108 may be limited to unlocking access devices for controlled areas that the user of the user device 104 is authorized to access. For example, if a user had a room reservation at a hotel, the access code may be limited to providing the user with access to his reserved room and other locations to which the reservation entitles the user (e.g., a fitness center, a parking lot). Thus, if the reservation of the user does not give the user access rights to a VIP room, then the access code may not provide the user with access to the VIP room. The access code 108 may also be limited to unlocking access devices during a specific period of time that the user of the user device 104 is authorized to access the controlled locations. For example, if a user has a reservation at a hotel for three days, then the access code 108 may only provide the user with access to one or more controlled locations at the hotel for the three days of his reservation.

The system 100 may also include a management system 200. The management system 200 may be a collection of different devices and servers running various software components. The management system 200 may be connected to the user device 104, one or more networks (e.g., a geospatial network 110, a network 120), and additional device(s) 160, 170 via the one or more networks (e.g., satellite 112, central reservation system 140). The management system 200 may be configured to manage one or more access devices (e.g., access device 150) of the system 100. In certain aspects, the management system 200 may include a lock server. The lock server may be configured to verify information regarding the user (e.g., credentials, access keys) and issue one or more control messages to an access device (e.g., access device 150).

The system 100 may also include an access device 150. The access device 150 may be a locking device that secures a door or other access point to a controlled area, such as a room, an elevator, a parking lot, a fitness center, or a VIP club. In particular, the access device 150 may be an electronic lock such as a RFID lock capable of being controlled by one or more of the user device 104, the management system 200, and other devices. While only a single access device 150 is depicted in FIG. 3, those of ordinary skill in the art would appreciate that the system 100 may include any number of access devices capable of accomplishing the methods disclosed herein.

The user device 104 and the management system 200 may be connected to the geospatial network 110 via a wired or wireless connection. The geospatial network 110 may be a local area network, a wide area network, an intranet, an extranet, the Internet, or any other type of network known in the art. The geospatial network 110 may be configured to allow data to be exchanged between devices connected to the geospatial network 110, including the user device 104, the management system 200, and other devices such as a satellite 112, a cell tower 114, a Wi-Fi hotspot 116, a camera 118, and other device(s) 160. Other device(s) 160 may include one or more additional satellites, cell towers, Wi-Fi hotspots, and cameras as well as other devices such as a server, a desktop or laptop personal computer, a tablet, a mobile device, or any other type of computer system or device. In various aspects, the geospatial network 110 may support communication via any suitable wired or wireless general data networks, such as types of Ethernet networks. Additionally, the geospatial network 110 may support communication via telecommunications/telephony networks, such as analog voice networks or digital fiber communications networks, and communication via storage area networks (SANs), such as Fibre Channel SANs, or communication via any other suitable type of network and/or protocol.

The geospatial network 110 may connect resources aimed at coordinating and sharing geographical data and other location-based data regarding objects. In particular, the geospatial network 110 may connect one or more devices capable of providing location data and/or determining a location of the user device 104. For example, the geospatial network 110 may include a GPS or GNSS satellite (e.g., satellite 112 and other device(s) 160) capable of providing a location of the user device 104. As another example, when the user device 104 is a cell phone, the geospatial network 110 may include a group of radio towers (e.g., cell tower 114 and other device(s) 160) that can provide a general location of the user device 104 based on the strength of the signal that they receive from the user device 104. As yet another example, when the user device 104 is within a place of hospitality, the geospatial network 110 may include one or more proximity sensors (e.g., Wi-Fi hotspot 116, camera 118, and other device(s) 160) that are located within the place of hospitality to detect the user device 104 and determine its location at the place of hospitality.

The user device 104 and the management system 200 may also be connected to the network 120 via a wired or wireless connection. Similar to the geospatial network 110, the network 120 may be a local area network, a wide area network, an intranet, an extranet, the Internet, or any other type of network known in the art. The network 120 may be configured to allow data to be exchanged between devices connected to the network 120 or other networks connected to the network 120. In various aspects, the network 120 may support communication via any suitable wired or wireless general data networks, such as types of Ethernet networks. Additionally, the network 120 may support communication via telecommunications/telephony networks, such as analog voice networks or digital fiber communications networks, via SANs, such as Fibre Channel SANs, or via any other suitable type of network and/or protocol. In certain aspects, the network 120 may be a PAN such as a Zigbee network.

The devices connected to network 120 may include the user device 104, the management system 200, a central reservation system 140, the access device 150, and other device(s) 170. The central reservation system 140 may be a collection of different devices and servers running various software components. The central reservation system 140 may store and distribute information regarding one or more places of hospitality. Specifically, the central reservation system 140 may store information regarding reservations made by guests at a place of hospitality. Such information may be stored in one or more databases or other organizational formats. The reservations may indicate a number of controlled areas that a guest is authorized to access. For example, the reservations may indicate that a particular guest has access rights to a room at the place of hospitality. The reservations may also indicate that the particular guest has access rights to a fitness center located at the place of hospitality. The other device(s) 170 may include a server, a desktop or laptop personal computer, a tablet, a mobile device, or any other type of computer system or device.

Figure 4:
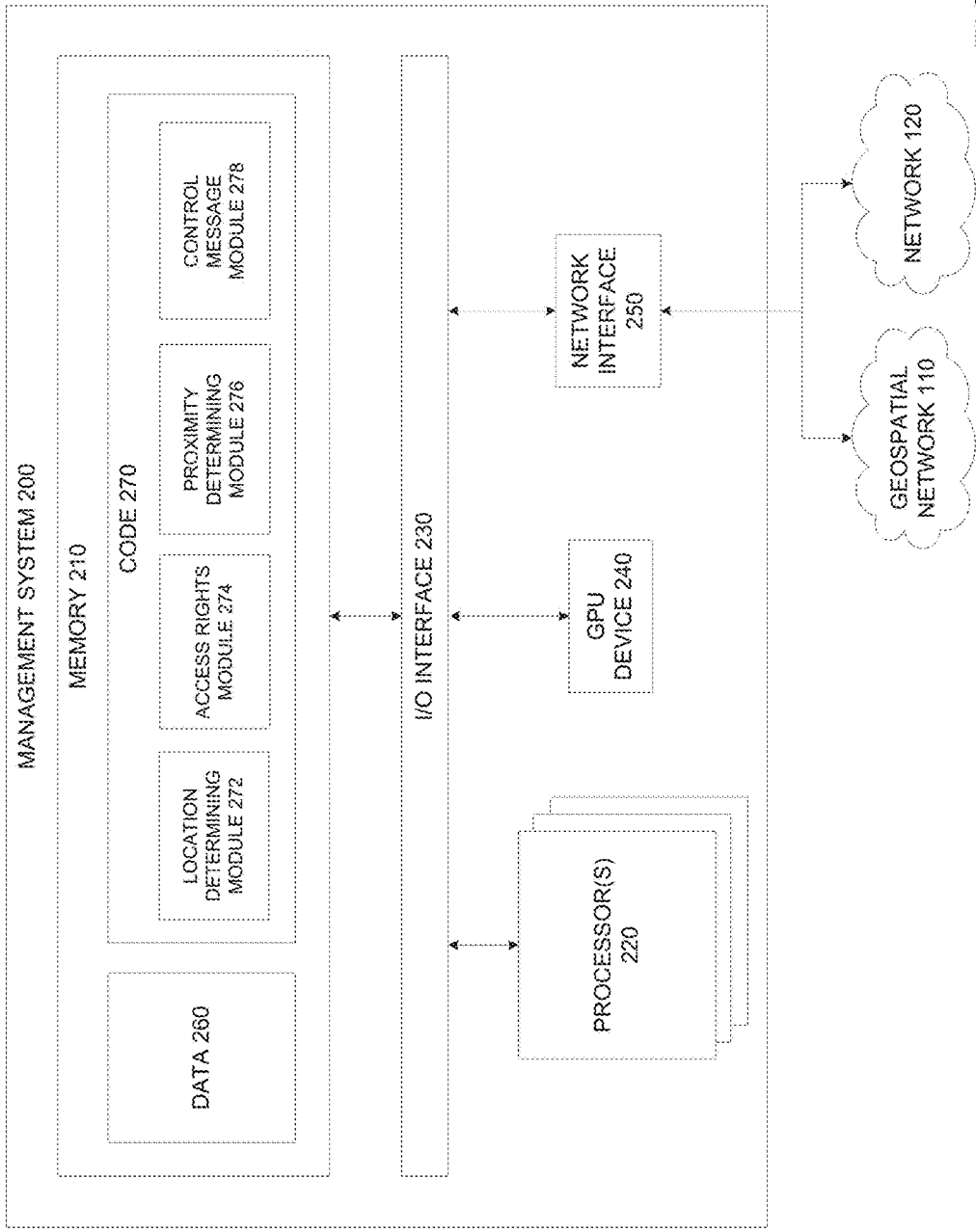
FIG. 4 illustrates an example management system for managing access devices at a place of hospitality according to certain aspects of the disclosure.

Referring now to FIG. 4, the management system 200 is described. The management system 200 may include a memory 210 and one or more processor(s) 220. The memory 210 may include any type of computer-readable medium, such as a memory device (e.g., random access, flash memory, and the like), a magnetic or optical medium (e.g., a CD, DVD, BluRay®, and the like), firmware (e.g., an erasable programmable read only memory), or any other storage medium. The memory 210 stores computer-readable instructions that instruct the management system 200 to perform certain processes. In particular, the memory 210 stores code 270 including a plurality of modules: a location determining module 272, an access rights module 274, a proximity determining module 276, and a control message module 278. The modules may include logic embodied as hardware, firmware, or a collection of software written in a known programming language. Each of the modules may be executed by at least one of the processor(s) 220. The memory 210 may also store data 260. The data 260 may include data relating to the place of hospitality such as a virtual map of the place of hospitality (see FIG. 5), the location of access devices and controlled areas at the place of hospitality, access keys for access devices, and reservation information. The data 260 may also include settings indicating when control messages are to be sent to an access device (e.g., access device 150). Specifically, such settings may indicate when a control message for configuring the access device 150 to operate in a wake mode is to be sent to the access device.

The processor(s) 220 may be any suitable processors capable of executing instructions. For example, in various aspects, the processor(s) 220 may be general-purpose or embedded processors implementing any of a variety of instruction set architectures (ISAs), such as the x86, PowerPC, SPARC, or MIPS ISAs, or any other suitable ISA. In certain aspects, each of the processor(s) 220 may commonly, but not necessarily, implement the same ISA.

The management system 200 may also include a graphics processing unit (GPU) 240. GPU 240 may participate in providing graphics rendering and/or physics processing capabilities. GPU 240 may, for example, include a highly parallelized processor architecture specialized for graphical computations. In some aspects, the processor(s) 220 and the GPU 240 may be implemented as one or more of the same type of device.

In addition, the management system 200 may include an input/output (I/O) interface 230. The I/O interface 230 may be configured to coordinate I/O traffic between the processor(s) 220, the memory 210 and any peripherals in the device, including a network interface 250 or other peripheral interfaces. In some aspects, the I/O interface 230 may perform any necessary protocol, timing or other data transformations to convert data signals from one component (e.g., the memory 210) into a format suitable for use by another component (e.g., the processor(s) 220). In some aspects, the I/O interface 230 may include support for devices attached through various types of peripheral buses, such as a variant of the Peripheral Component Interconnect (PCI) bus standard or the Universal Serial Bus (USB) standard. In some aspects, the function of the I/O interface 230 may be split into two or more separate components, such as a north bridge and a south bridge. Also, in some aspects some or all of the functionality of the I/O interface 230, such as an interface to the memory 210, may be incorporated directly into the processor(s) 220.

The network interface 250 may be configured to allow data to be exchanged between the management system 200 and other devices attached to the geospatial network 110 and/or the network 120. In various aspects, the network interface 250 may support communication via any suitable wired or wireless general data networks, such as types of Ethernet networks, for example. Additionally, the network interface 250 may support communication via telecommunications/telephony networks, such as analog voice networks or digital fiber communications networks, via storage area networks, such as Fibre Channel SANs, or via any other suitable type of network and/or protocol.

In certain aspects, the components of the management system 200 may be located on a number of different servers and/or devices. In some aspects, the functionality of some of the components of the management system 200 may not be provided and/or other additional functionality may be available.

Figure 5:
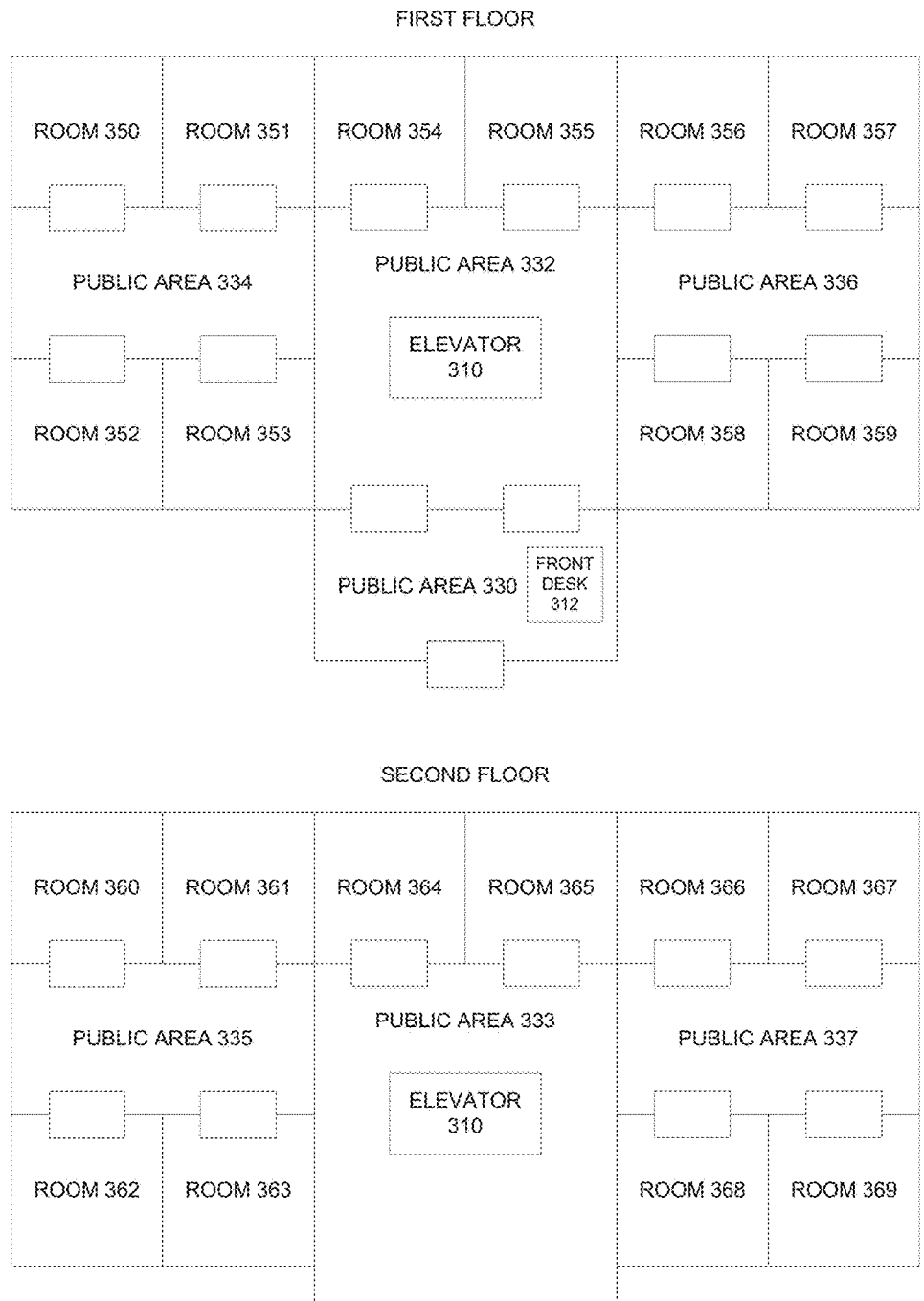
FIG. 5 illustrates an example virtual map of a place of hospitality.

FIG. 5 depicts an example virtual map of a place of hospitality. As shown in the virtual map, the place of hospitality may include a first floor and a second floor. On the first floor, there may be a public area 330 near a front entrance of the place of hospitality including a front desk 312. The first floor may also include public areas 332, 334, 336 and rooms 350-359. On the second floor, there may be public areas 333, 335, 337 and rooms 360-369. An elevator 310 may be located in a central location of the place of hospitality. The elevator may extend from the first floor to the second floor.

A virtual map such as the one depicted in FIG. 5 may be used by systems and methods disclosed herein to provide access to a controlled area. Specifically, the management system 200 may use the virtual map to monitor the location of a device (e.g., user device 104) relative to a controlled area. The controlled area may be, for example, any one of rooms 350-369. When the device is recognized as being in certain predetermined locations relative to the controlled area (e.g., entering a particular area of the place of hospitality that is proximate to the controlled area), the management system 200 may send a control message to an access device (e.g., access device 150) associated with the controlled area. In particular, when the user device is within a first area proximate to the controlled area, the management system 200 may send a first control message to the access device associated with the controlled area to configure the access device to operate in a wake mode (i.e., a mode ready for receiving an unlock event). Then, when the user device is within a second area proximate to the controlled area, the management system 200 may send a second control message including an unlock event to the access device associated with the controlled area. The access device, upon receiving the second control message, may unlock and provide access to the controlled area.

As an illustrative example, assume that a user with the user device 104 is walking towards the room 360. The room 360 may be a controlled area, and the user may be authorized to access the room 360. The access device 150 may be configured to provide access to the room 360. The user may enter the place of hospitality and be located in the public area 330. The management system 200, upon detecting that the user device 104 is located in the public area 330, may send a first control message to the access device 150 to configure the access device 150 to operate in a wake mode. In the wake mode, the access device 150 may be configured to receive an unlock event instructing the access device 150 to unlock and provide access to the room 360. The user may walk through the public areas 330, 332 and take the elevator 310 to the second floor. The management system 200, upon detecting that the user device 104 has exited the elevator 310 on the second floor, may send a second control message including an unlock event to the access device 150. The access device 150 receiving the second control message may unlock to provide the user with access to the room 360. The user arriving at the door to the room 360 may then actuate a handle on the door of the room 360 to gain access to the room 360 without having to present a key card.

In certain aspects, a virtual map such as the one depicted in FIG. 5 may be stored in the memory 210 of the management system 200. The management system 200 may use the virtual map to determine when a device (e.g., user device 104) is within certain area of the place of hospitality. In particular, the management system 200 may use the virtual map to determine when the user device 104 is within one or more areas proximate to a controlled area. In other aspects, the virtual map of FIG. 5 may be stored in a device/server separate from the management system 200. For example, the virtual map may be stored in a remote server. The separate device/server may be connected to network 120 and therefore accessible to the management system 200. The management system 200 may connect to the separate device/server via network 120 to obtain data regarding the virtual map.

Figure 6:
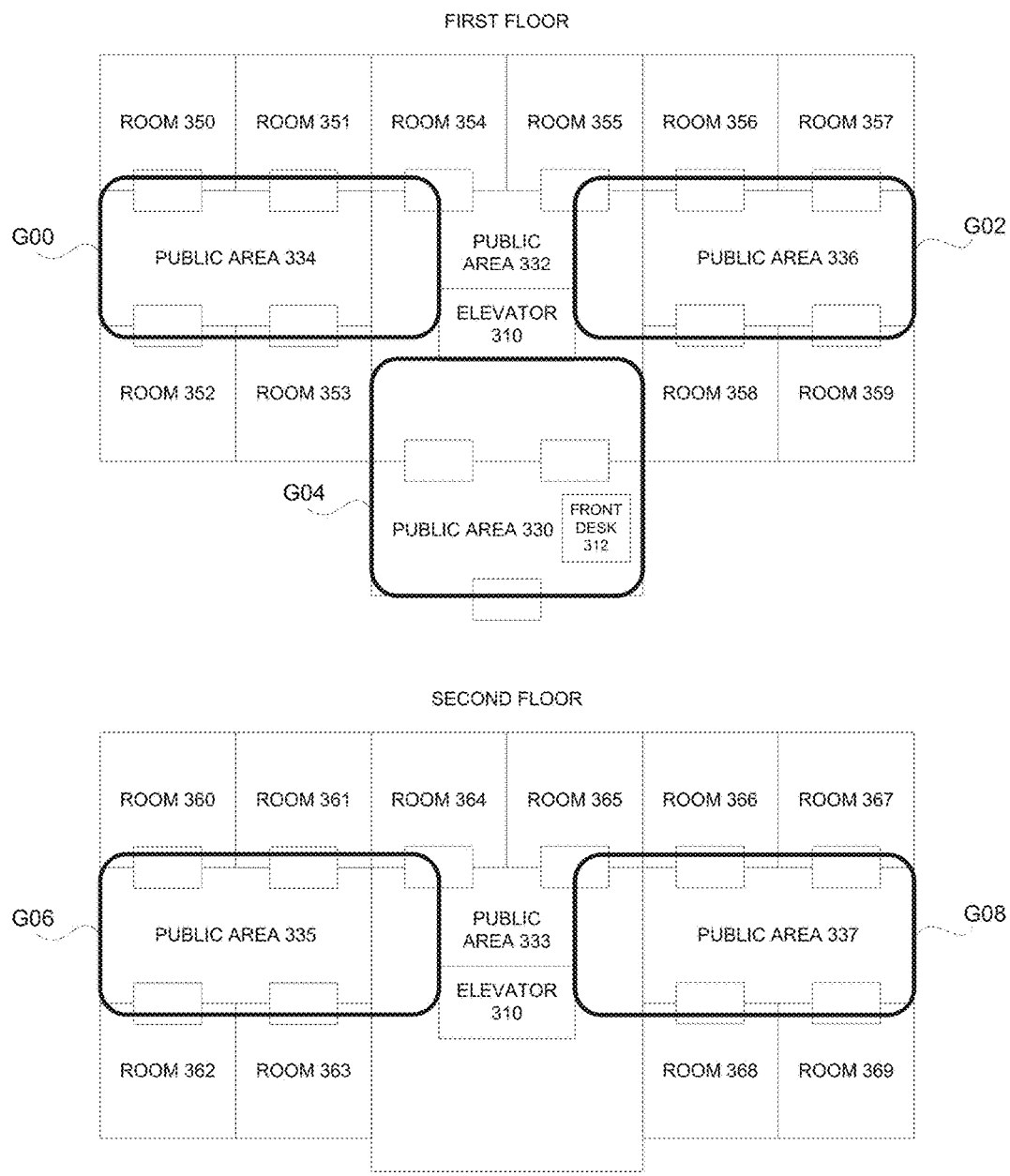
FIG. 6 illustrates an example virtual map of a place of hospitality including a plurality of geofences.

FIG. 6 depicts the example virtual map of the place of hospitality now including a plurality of geofences G00-G08. A geofence may be a virtual barrier. The plurality of geofences G00-G08 may be set up utilizing the virtual map depicted in FIG. 5 in conjunction with a radio map of the place of hospitality based on the specific signature of various frequencies in the place of hospitality. The plurality of geofences G00-G08 may be set up in order to determine ingress, egress, and pivots through the place of hospitality by a guest.

In particular, the plurality of geofences G00-G08 may be used by systems and methods disclosed herein to set up an alert for when a device (e.g., user device 104) enters a particular area defined by the geofences. For example, the geofence G04 may define an area near a front entrance of the place of hospitality. Accordingly, the geofence G04 may be used to monitor when a device has passed through the geofence G04 and entered the area near the front entrance. The plurality of geofences G00-G08 may be placed on the virtual map of the place of hospitality to optimize when to send one or more control messages to a particular access device (e.g., access device 150). For example, the geofence G04 placed optimally at the entrance of the place of hospitality may alert the management system 200 of when to send a first control message to the access device 150 to configure the access device 150 to operate in a wake mode. As another example, the geofence G06 may be placed optimally in a hallway leading to the access device 150 (assuming that the access device 150 is located on the door to the room 360) in order to trigger when to send a second control message to the access device 150 to unlock.

Figure 7:
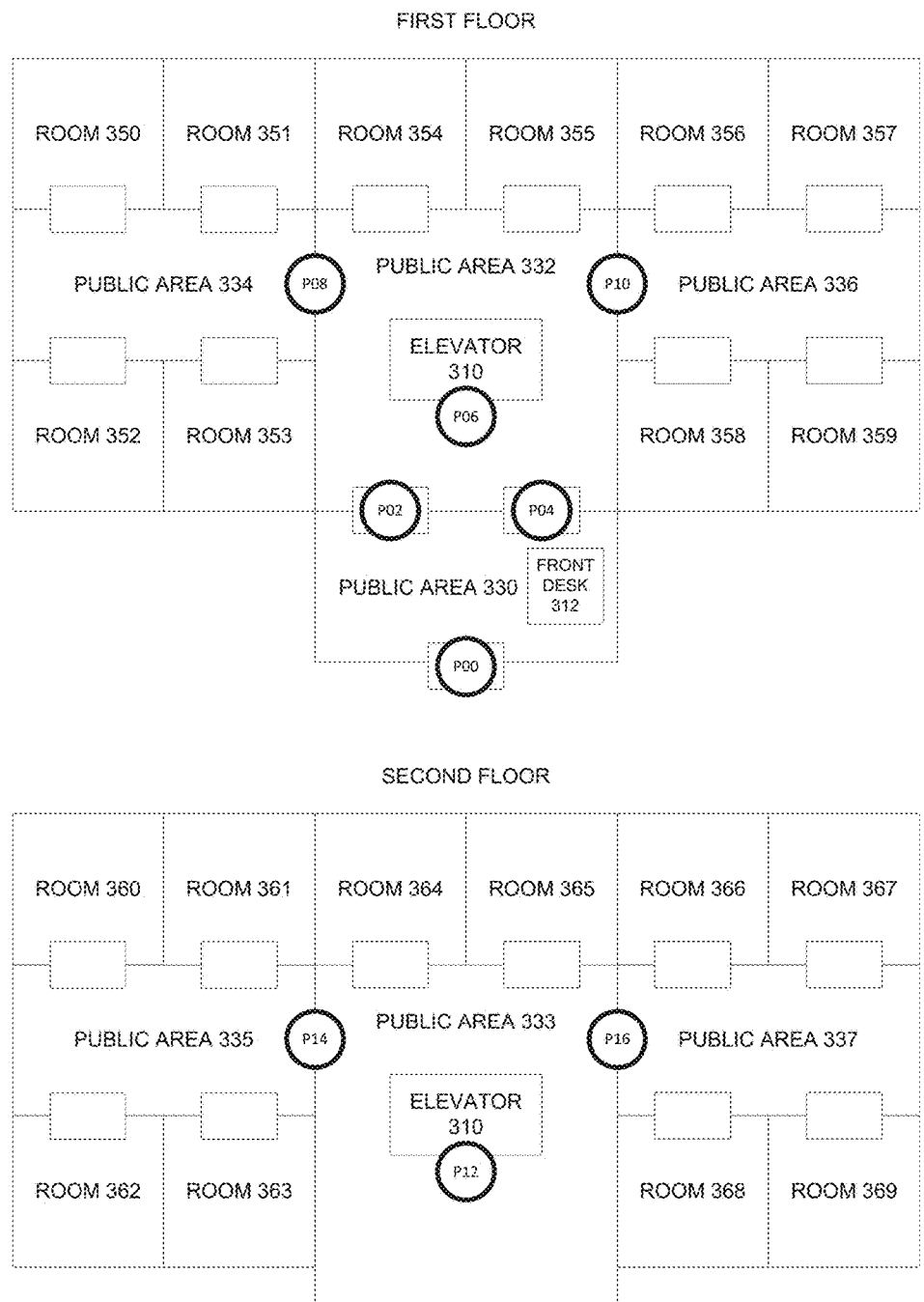
FIG. 7 illustrates an example virtual map of a place of hospitality including a plurality of pivot points.
Figure 8A:
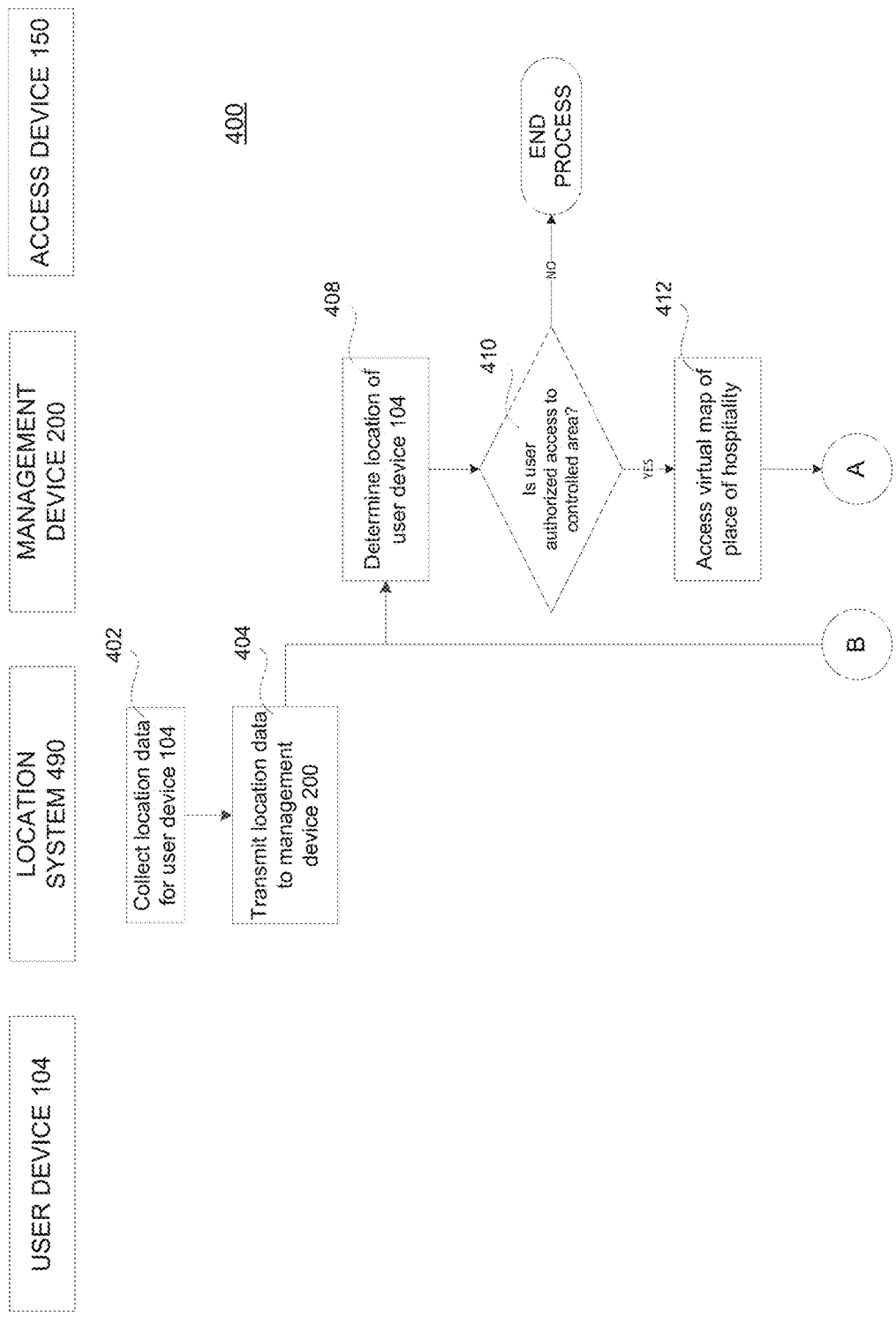
FIGS. 8A, 8B, 8C, and 8D illustrate a flowchart showing an example process for providing access to a controlled area at a place of hospitality according to certain aspects of the disclosure.
Figure 8B:
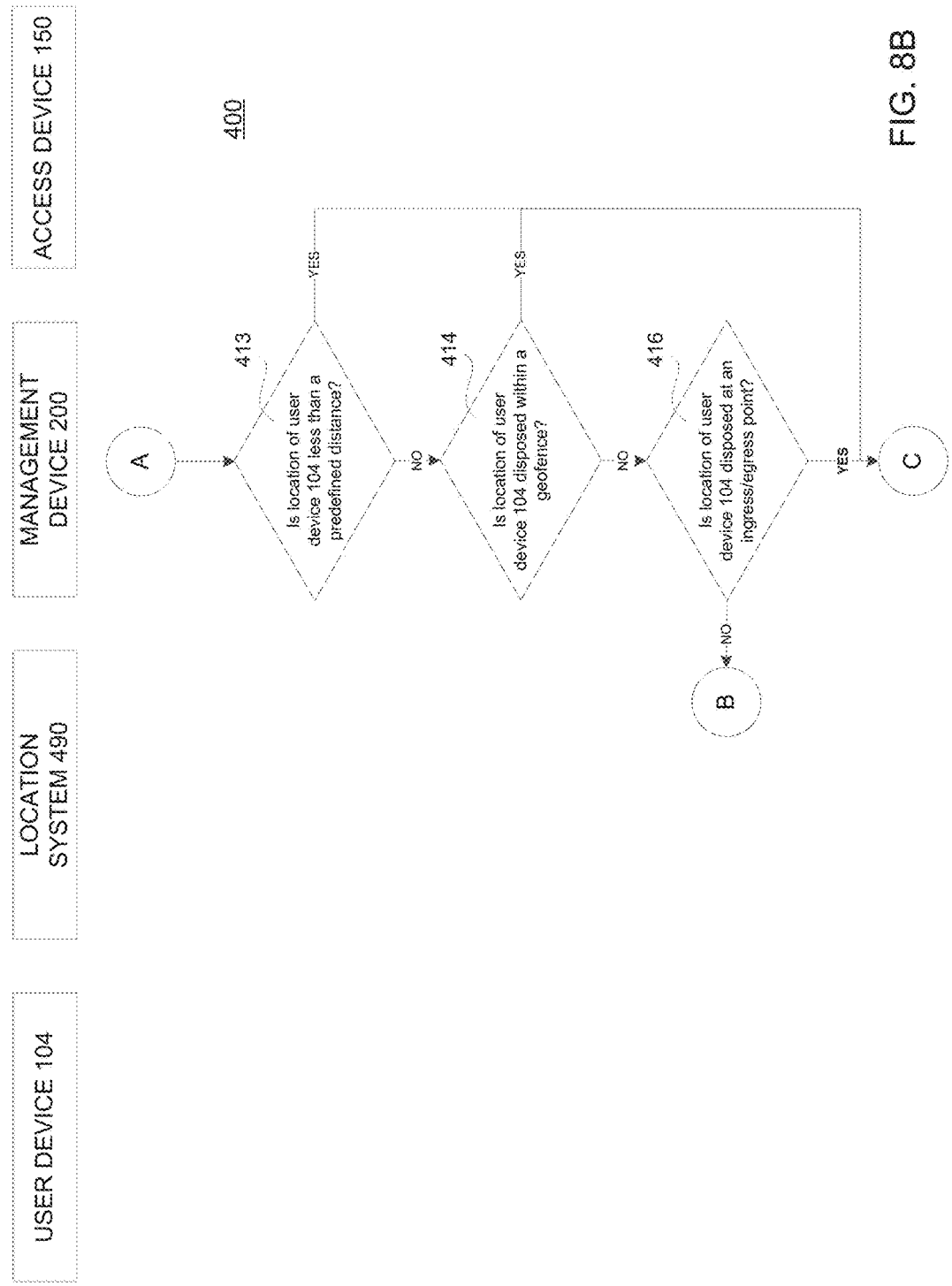
Figure 8C:
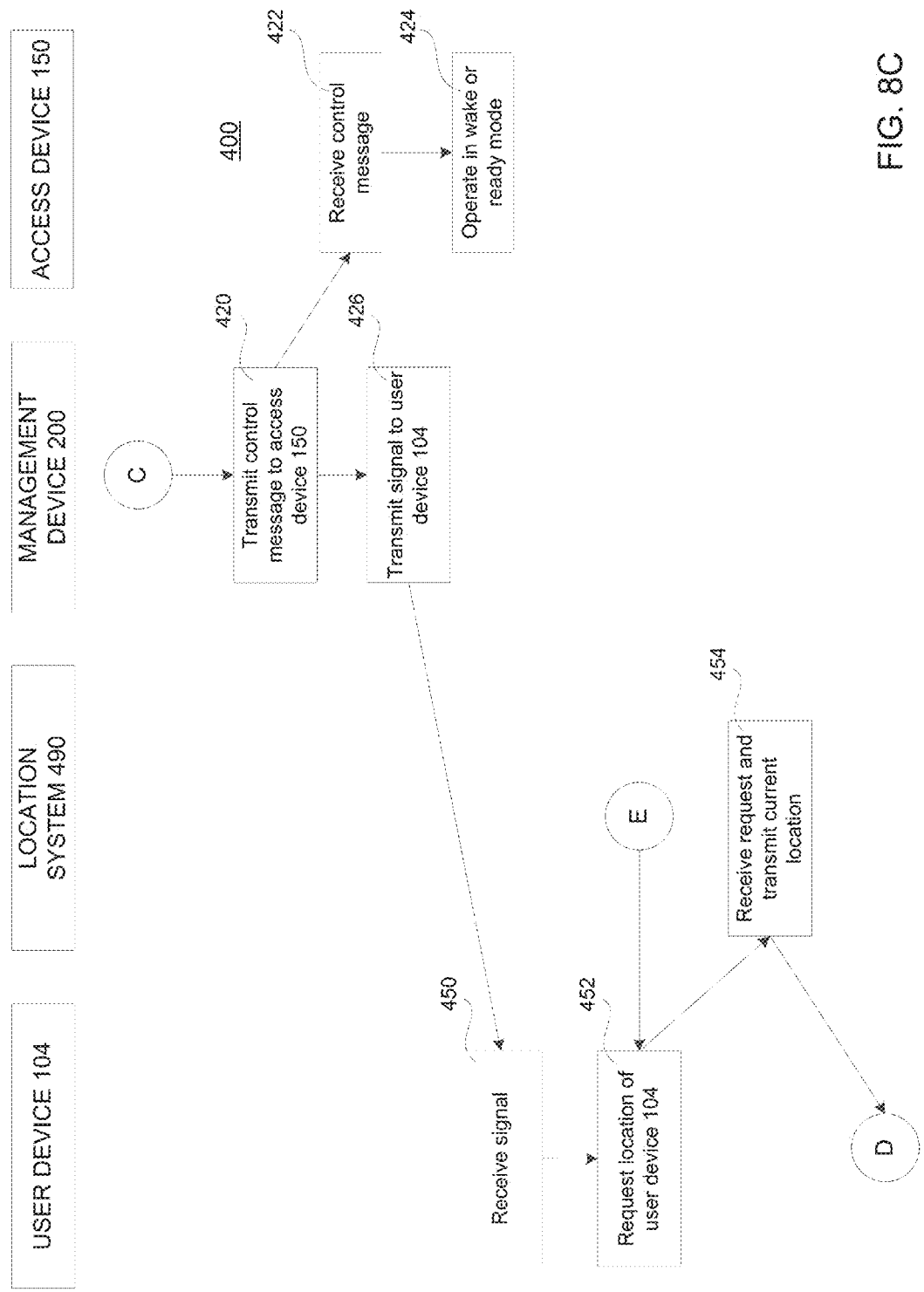
Figure 8D:
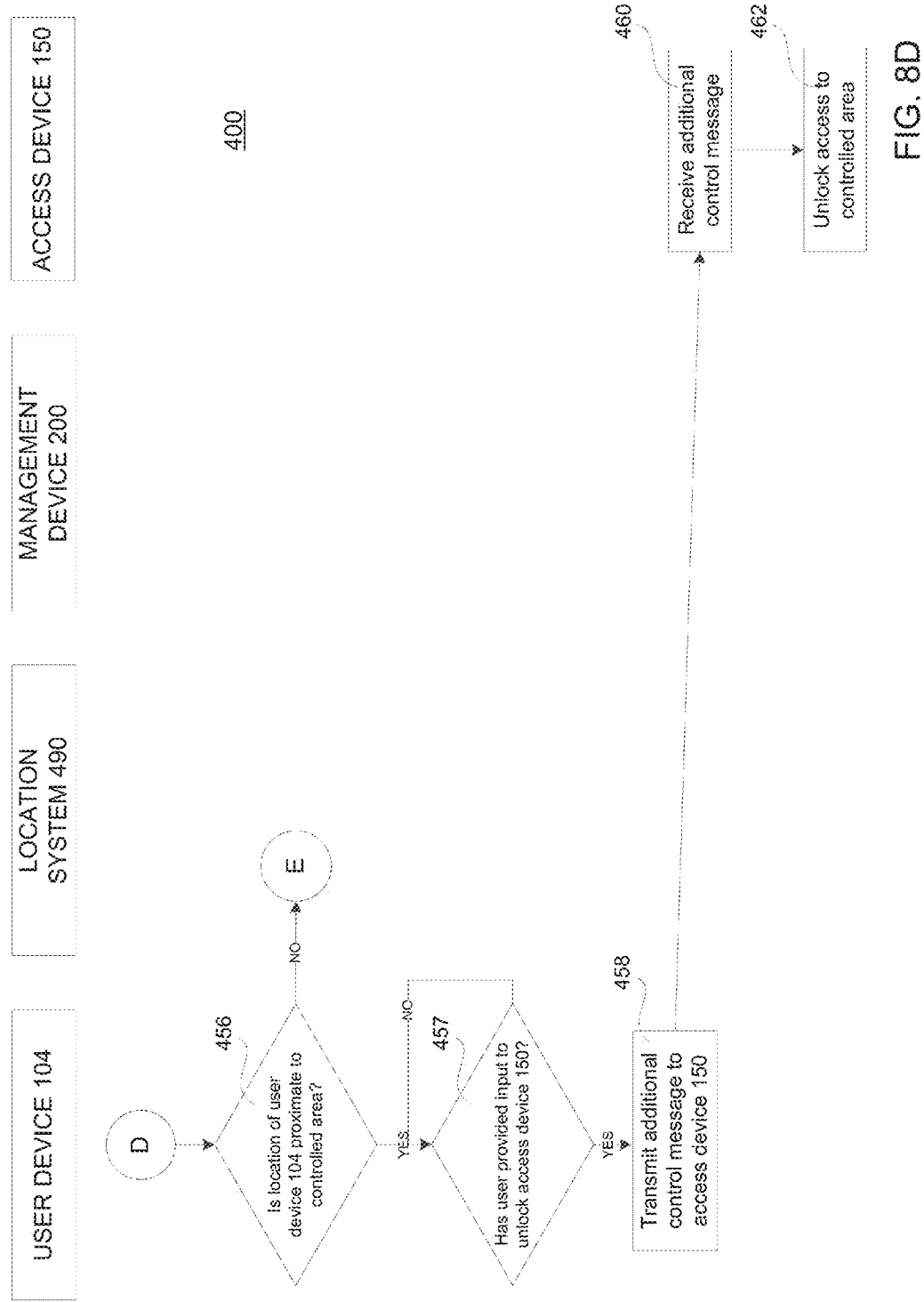

FIG. 7 depicts the example virtual map of the place of hospitality now including a plurality of pivot points P00-P16. The pivot points P00-P16 may represent critical locations within the place of hospitality. In particular, the pivot points P00-P16 may show the positioning of Bluetooth devices or other sensors at ingress, egress, and pivot points in the place of hospitality. Thus, the pivot points P00-P16 may mark particular ingress, egress, and pivot points. As an example, a pivot point P00 may mark an ingress point at the front of the place of hospitality. As another example, a pivot point P14 may mark a pivot point into the public area 335 (e.g., a hallway). The pivot points P00-P16 may enable accurate positioning of a user and augment a radio map associated with other positioning services.

While select methods of monitoring a location of a user within a place of hospitality are described in reference to FIGS. 5 through 7, one of ordinary skill in the art would appreciate that other methods of determining the location of user may also be used. In particular, to achieve a high level of accuracy in predicting the location of a user in an indoor space (e.g., a place of hospitality), a hybrid indoor positioning system may be used. The hybrid indoor positioning system may employ a combination of infrastructure services (e.g., Wi-Fi positioning, GPS, CASS, assisted GPS, and cellular triangulation), pivot point radio frequency enabled devices (e.g., near field communication (NFC), Bluetooth, and RFID devices), and mobile phone sensors such as a magnetometer in conjunction with a mobile application and application server to determine a location of a user device. In the hybrid system, an infrastructure service may be used to provide signal strength fingerprint-based positioning. The mobile phone sensor such as a magnetometer may provide dead reckoning (i.e., heading or, more specifically, a prediction of a current position of the device based on an earlier position). And the pivot point radio frequency enabled devices, in conjunction with the infrastructure service and the mobile phone sensors, may partition the indoor space at pivot points to provide an added level of accuracy.

Although each of the different positioning technologies described above may be associated with certain accuracy limitations, the use of these technologies together may provide a robust method of estimating the location of a user. In particular, a hybrid positioning method may be an improvement over single-band sensor approaches as a result of its divide-and-conquer manner.

Referring now to FIGS. 8A through 8D, an example method for providing access to a controlled area at a place of hospitality is described. For illustration purposes, the method depicted in FIGS. 8A through 8D is described in reference to one or more elements of FIGS. 1 through 7.

In method 400, a location system 490 may collect location data of the user device 104 (step 402). The location system 490 may include one or more devices connected to the geospatial network 110. For example, the location system 490 may include GPS or GNSS satellites such as the satellite 112. The location system 490 may also include Wi-Fi access points that are located at a place of hospitality such as the Wi-Fi hotspot 116. The GPS or GNSS satellites may collect geospatial data on the user device 104, and a Wi-Fi sensor located on the user device 104 may measure the intensity of signals received from the Wi-Fi access points or received signal strengths (RSS).

At step 404, the location system 490 may transmit the collected location data to the management system 200. At step 408, the management system 200, via one or more processors 220 executing location determining module 272, may determine a location of the user device 104. The management system 200 may determine the location of the user device 104 using, for example, the location data received from the location system 490. For instance, if the location data included measures of the RSS of a plurality of Wi-Fi access points, then the management system 200 may use triangulation techniques to pinpoint the location of the user device 104. When more than one type of location data is collected (e.g., cellular, Wi-Fi, Bluetooth, GPS, GNSS, etc.), the management system 200 may also determine the location of the user device 104 by using several different positioning techniques.

In certain aspects, the location system 490 may determine the location of the user device 104. The management system 200 may then determine the location of the user device 104 by accessing and retrieving the location of the user device 104 from the location system 490.

At step 410, the management system 200, via one or more processors 220 executing access rights determining module 274, may determine whether a user associated with the user device 104 has access rights to a controlled area (i.e., is authorized to access a controlled area) at the place of hospitality. Controlled areas at a place of hospitality may include guest rooms, a fitness center, a parking lot, a VIP club, or other areas with restricted access. The management system 200 may determine the access rights of the user associated with the user device 104 by accessing information stored on the central reservation system 140. The central reservation system 140 may store information regarding reservations made by guests at the place of hospitality. The management system 200 may determine whether the user has a reservation at the place of hospitality based on the information stored on the central reservation system 140. For example, the management system 200 may look up the user in the central reservation system 140 and find a reservation associated with the user. When the user has a reservation, the management system 200 may determine whether the reservation grants the user any access rights to controlled areas at the place of hospitality (i.e., whether the reservation authorizes access to any controlled areas at the place of hospitality).

If the management system 200 determines that the user associated with the user device 104 has access rights to a controlled area at the place of hospitality (step 410: YES), then the method may proceed to step 412. If the management system 200 determines that the user associated with the user device 104 does not have access rights to any controlled area at the place of hospitality (step 410: NO), then the method may terminate.

At step 412, the management system 200, via one or more processors 220 executing proximity determining module 276, may access a virtual map of the place of hospitality. The virtual map may be stored in the memory 210 of the management system 200 or may be stored in a remote device or server that is accessible to the management system 200. For illustration purposes, the virtual map may be the example virtual maps depicted in FIGS. 5, 6, and 7.

At steps 413 through 416, the management system 200, via one or more processors 220 executing proximity determining module 276, may determine when the location of the user device 104 is within a first area proximate to the controlled area that the user is authorized to access. The management system 200 may be determining when the user device 104 is located within a first area proximate to the controlled area in order to know when to send a first control message for configuring an access device to operate in a wake mode to the access device for the controlled area. The management system 200 may want to ensure that the first control message is sent sufficiently in advance of the user's approach to the controlled area so that the user does not experience a delay in gaining access to the controlled area. As depicted in FIG. 1, a delay may arise if the access device for the controlled area is in a sleep mode when the user arrives at the controlled area.

At step 413, the management system 200 may determine whether the location of the user device 104 is less than a predefined distance from the controlled area. The management system 200 may calculate a distance between the location of the user device 104 and the controlled area. The distance may be, for example, a straight-line distance between the location of the user device 104 and the controlled area or a travel distance (i.e., a distance measuring the path of travel) between the location of the user device 104 and the controlled area. The management system 200 may then determine when the determined distance is less than a predefined value indicating that the location of the user device 104 is within the first area proximate to the controlled area.

When the management system 200 determines that the location of the user device 104 is less than the predefined distance from the controlled area (step 413: YES), then the method may proceed onto step 420. When the management system 200 determines that the location of the user device 104 is not less than the predefined distance from the controlled area (step 413: NO), then the method may proceed to step 414. In certain aspects, regardless of whether the management system 200 determines that the location of the user device 104 is less than the predefined distance from the controlled area, the method may proceed to step 414. In other aspects, when the management system 200 determines that the location of the user device 104 is not less than the predefined distance from the controlled area, the method may proceed back to step 408, where the management system 200 may determine a new location for the user device 104.

At step 414, the management system 200 may determine whether the location of the user device 104 is within a predefined geofence. The predefined geofence may enclose the first area that is proximate to the controlled area. The management system 200 may use a virtual map of the place of hospitality to determine when the user device 104 crosses a geofence and is located within the boundaries of the geofence. For example, the management system 200, referencing the example virtual map in FIG. 6 including the plurality of geofences G00-G08, may determine whether the user device 104 is located within a particular geofence (e.g., geofence G04).

When the management system 200 determines that the location of the user device 104 is located within a predefined geofence (step 414: YES), then the method may proceed onto step 420. When the management system 200 determines that the location of the user device 104 is not with a predefined geofence (step 414: NO), then the method may proceed to step 416. In certain aspects, regardless of whether the management system 200 determines that the location of the user device 104 is within a predefined geofence, the method may proceed to step 416. In other aspects, when the management system 200 determines that the location of the user device 104 is not within a predefined geofence, the method may proceed back to step 408, where the management system 200 may determine a new location for the user device 104.

As step 416, the management system 200 may determine whether the location of the user device 104 is disposed at an entrance or ingress/egress (e.g., a pivot point) to the place of hospitality. In particular, the management system 200, referencing a virtual map of the place of hospitality such as the example virtual map depicted in FIG. 7 including the plurality of pivot points P00-P16, may determine whether the user device 104 has been detected at a pivot point near the entrance to the place of hospitality. A sensor such as a Bluetooth device may be located at the pivot point. The sensor may be configured to transmit a signal to the management system 200 via the geospatial network 110 when the sensor detects the user device 104. Accordingly, the management system 200 may determine whether the user device 104 is located at a particular pivot point by determining whether the sensor located at the pivot point has detected the presence of the user device 104.

When the management system 200 determines that the location of the user device 104 is located at a particular pivot point such as an ingress/egress point (step 416: YES), then the method may proceed onto step 420. When the management system 200 determines that the location of the user device 104 is not located at a particular pivot point (step 416: NO), then the method may proceed back to step 408, where the management system 200 may determine a new location for the user device 104.

In certain aspects, steps 413, 414, and 416 may be performed concurrently, sequentially, or in a different order. In other aspects, one or more of steps 413, 414, or 416 may be eliminated.

At step 420, the management system 200, via one or more processors 220 executing control message module 278, may transmit a control message to the access device of the controlled area or, specifically, the access device 150. This control message may correspond to the "signal configured to cause the access device to operate in a first mode" referred to in the claims. The control message may include instructions that, when executed by the access device 150, may cause the access device 150 to operate in a wake mode. In the wake mode, the access device may be configured to receive and respond to additional control messages from the management system 200. In particular, the access device when operating in the wake mode may be configured to receive and respond an unlock control message (i.e., a message that instructs the access device 150 to unlock). At step 426, the management system 200 may also transmit a signal to the user device 104. Steps 420 and 426 may be performed concurrently, in the order shown, or in a different order.

At step 422, the access device 150 may receive the control message. At step 424, the access device 150 may operate in a wake or ready mode. Prior to receiving the control message, the access device 150 may have been operating in a sleep mode. In the sleep mode, the access device 150 may have had limited functionality. In particular, the access device 150 operating in the sleep mode may not respond to receiving an unlock control message instructing the access device 150 to unlock and provide access to the controlled area. The access device 150 may switch from operating in the sleep mode to operating in the wake mode in response to receiving the control message sent by the management system 200.

At step 450, the user device 104 may receive the signal sent by the management system 200. The signal may configure the user device 104 to determine when to send an additional control message to the access device 150. This additional control message may correspond to the "signal configured to cause the access device to provide access to the controlled area." This additional control message may be referring to as an "unlock control message." The unlock control message may include instructions that, when executed by the access device 150, may cause the access device 150 to unlock and provide access to the controlled area.

At steps 452 and 454, the user device 104 may communicate with the location system 490 to determine a current location of the user device 104. In particular, since the management system 200 had determined that the location of the user device 104 is within a first area proximate to the controlled area, the user (carrying the user device 104) may have moved to a new location. For example, as the user walked through the front entrance of the place of hospitality, he may have set off a sensor that informed the management system 200 that the user was within the first area proximate to the controlled area. The user may have continued to walk through the place of hospitality while the management system 200 sent a first control message to the access device 150 to configure it to operate in a wake mode. Referring to virtual map of the place of hospitality, as depicted in FIG. 5, the user may have walked through the public area 330 and continued onto the elevator 310. As the user is travelling through the place of hospitality, the user device 104 may monitor the movement of the user device 104 in order to determine when the user device 104 is in a second area proximate to the controlled area. The user device 104 may begin monitoring the movement of the user device 104 after receiving the signal from the management system 200.

At step 456, the user device 104, having determined a current location of the user device 104 by communicating with location system 490, may determine whether the current location of the user device 104 is in a second area proximate to the controlled area. The second area proximate to the controlled area may be located closer to the controlled area than the first area proximate to the controlled area. For example, if the controlled area is the room 360, then the first area proximate to the controlled area may be the area defined by the geofence G04 (see FIG. 6), and the second area proximate to the controlled area may be the area defined b the geofence G06 (see FIG. 6). As another example, if the controlled area is the room 364, then the first area proximate to the controlled area may be an area including pivot points P00, P02, and P04, and the second area proximate to the controlled area may be pivot point P12 (e.g., when the user first walks off the elevator on the second floor).

If the user device 104 determines that the current location of the user is within the second area proximate to the controlled area (step 456: YES), then the method may proceed to step 457. If the user device 104 determines that the current location of the user is not within the second area proximate to the controlled area (step 456: NO), then the method may proceed back to step 452, where the user device 104 again communicates with the location system 490 to determine a current location of the user device 104. The user device 104 may continue to monitor the movement of the user device 104 through the place of hospitality by communicating with the location system 490 indefinitely or until a certain condition is met. For example, the user device 104 may continue to monitor its movement until a certain amount of time has passed, it determines that it is no longer located at the place of hospitality, it has received an instruction from the user or another external source to cease monitoring, etc.

At step 457, the user device 104 may wait on an input from the user to unlock the access device 150. Specifically, the user device 104 may determine whether the user has provided an input to unlock the access device 150. When the user provides the input to unlock the access device 150 (step 457: YES), the method may proceed to step 458. When the user does not provide the input to unlock the access device 150 (step 457: NO), the method may repeat step 457. In certain aspects, after checking for an input from the user for a predefined period of time, the method may terminate.

At step 458, the user device 104 may transmit the additional control message to the access device 150. In certain aspects, transmitting the additional control message may involve sending a signal to another device (e.g., a lock server or the management system 200) that in response transmits the additional control message to the access device 150. The additional control message may contain instructions that, when executed by the access device 150, may cause the access device 150 to unlock and provide access to the controlled area.

In some aspects, step 457 may also be eliminated. As a result, when the user device 104 determines that the current location of the user is within the second area proximate to the controlled area (step 456: YES), the method may continue to step 458, where the additional control message is transmitted to the access device 150. When the additional control message is an unlock control message (e.g., a control message including an unlock event), the elimination of step 457 may provide for the automatic unlocking of the access device 150.

In particular aspects, steps 452 through 458 may be performed by the management system 200 instead of the user device 104. In such aspects, the steps 426 and 450 may be eliminated.

At step 460, the access device 150 may receive the additional control message. And at step 462, the access device 150 may unlock access to the controlled area. The access device 150 may unlock access to the controlled area, for example, in response to receiving the additional control message.

Aspects of the disclosure may include communication channels that may be any type of wired or wireless electronic communications network, such as, e.g., a wired/wireless LAN, a wired/wireless PAN, a wired/wireless HAN, a wired/wireless WAN, a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wi-Fi, Bluetooth, and/or the like, and/or a combination of two or more thereof.

Aspects of the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. For example, the user device 104 may be a mobile smartphone operated by an advanced mobile data processing and communication operating system.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that is specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a CPU, and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

It should also be appreciated that the elements and systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, tablets, cellphones, wireless phones, pagers, electronic organizers, Internet appliances, and various other consumer products that include appropriate communication capabilities. In addition, the functionality provided by the illustrated elements may in some aspects be combined in fewer elements or distributed in additional elements. Similarly, in some aspects, the functionality of some of the illustrated elements may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

It will be appreciated that the present disclosure may include any one and up to all of the following examples.

Example 1

A method for managing access devices at a place of hospitality, comprising: determining a first location of a device of a user; determining that the user is authorized access to a controlled area; determining when the first location of the device of the user is within a first area proximate to the controlled area; and transmitting a first signal to an access device associated with the controlled area when the first location of the device of the user is within the first area proximate to the controlled area, the first signal used to manage an operation of the access device.

Example 2

The method of Example 1, wherein the access device is an electronic radio-frequency identification lock system.

Example 3

The method of Example 1, wherein the first location of the device of the user is determined based on at least one of: Global Positioning System data, cell tower data, Wi-Fi positioning data, Bluetooth positioning data, image data, and infrared sensor data.

Example 4

The method of Example 1, wherein the access device is configured to operate in a first mode in response to receiving the first signal.

Example 5

The method of Example 4, wherein the access device operating in the first mode is configured to provide access to the controlled area in a shorter period of time than the access device operating in a second mode.

Example 6

The method of Example 4, wherein the access device operating in the first mode uses a greater amount of energy than the access device operating in a second mode.

Example 7

The method of Example 4, wherein the access device operating in the first mode uses a greater amount of energy than the access device operating in a second mode.

Example 8

The method of Example 1, wherein the controlled area is a guest room at the place of hospitality.

Example 9

The method of Example 1, wherein determining that the user is authorized access to a controlled area at the place of hospitality comprises: accessing reservation information for the place of hospitality; determining that the user has a reservation at the place of hospitality; and determining a controlled area at the place of hospitality to which the reservation authorizes access.

Example 10

The method of Example 1, wherein determining when the first location of the device of the user is within the first area proximate to the controlled area comprises: determining a distance between the first location of the device of the user and the controlled area; and determining when the distance is less than a predefined value, the predefined value associated with the first area proximate to the controlled area.

Example 11

The method of Example 1, wherein determining when the first location of the device of the user is within the first area proximate to the controlled area comprises: accessing a virtual map of the place of hospitality, the virtual map comprising one or more geofences defining a boundary of the first area proximate to the controlled area; and determining when the first location of the device of the user is disposed within the one or more geofences.

Example 12

The method of Example 1, wherein determining when the first location of the device of the user is within the first area proximate to the controlled area comprises: receiving a second signal from a sensor located at a critical point in the place of hospitality, the sensor configured to transmit the second signal when the sensor detects the device of the user.

Example 13

The method of Example 12, wherein the critical point is at least one of: an ingress point, an egress point, and a pivot point.

Example 14

The method of Example 1, further comprising: determining a second location of the device of the user; determining when the second location of the device of the user is within a second area proximate to the controlled area; and transmitting a third signal to the access device associated with the controlled area when the second location of the device of the user is within the second area proximate to the controlled area, the third signal used to enable access to the controlled area.

Example 15

The method of Example 14, wherein at least a portion of the second area is disposed more proximate to the controlled area than the first area.

Example 16

A device for providing access to a controlled area at a place of hospitality, comprising: a processor; and a memory storing instructions. The instructions, when executed, cause the processor to: determine a location of a device of a user, wherein the user is authorized access to the controlled area; determine a location of a device of a user, wherein the user is authorized access to the controlled area; transmit a first signal to an access device associated with the controlled area when the location of the device is within the area proximate to the controlled area, the first signal used to enable access to the controlled area.

Example 17

The device of Example 16, device is at least one of: a tablet computer, and a mobile phone.

Example 18

The device of Example 16, wherein the location of the device of the user is determined based on at least one of: Global Positioning System data, cell tower data, Wi-Fi positioning data, Bluetooth positioning data, image data, and infrared sensor data.

Example 19

The device of Example 16, further comprising a receiver configured to receive an input from the user, wherein the instructions, when executed, cause the processor to transmit the first signal to the access device when the location of the device is within the area proximate to the controlled area and when the input from the user is received.

Example 20

The device of Example 16, wherein the memory further stores a code for accessing the controlled area, wherein the memory further stores a code for accessing the controlled area, Example 21

A system for providing access to a controlled area at a place of hospitality, comprising: an access device configured to provide access to the controlled area; and an access device management system comprising a processor, the access device management system configured to: determine, using the processor, a first location of a user device of a user; determine, using the processor, that the user is authorized access to the controlled area; determine, using the processor, when the first location of the user device is within a first area proximate to the controlled area; and transmit a first signal to the access device when the first location of the user device is within the first area proximate to the controlled area, the first signal used to manage an operation of the access device, where the user device configured to transmit a second signal to the access device when a second location of the user device is within a second area proximate to the controlled area, the second signal used to enable access to the controlled area.

Example 22

The system of Example 21, wherein the first location of the user device is determined based on at least one of: Global Positioning System data, cell tower data, Wi-Fi positioning data, Bluetooth positioning data, image data, and infrared sensor data.

Example 23

The system of Example 21, wherein the access device is configured to operate in a first mode in response to receiving the first signal.

Example 24

The system of Example 23, wherein the access device operating in the first mode is configured to provide access to the controlled area in a shorter period of time than the access device operating in a second mode.

Example 25

The system of Example 23, wherein the access device operating in the first mode uses a greater amount of energy than the access device operating in a second mode.

Example 26

The system of Example 21, wherein the access device management system is further configured to: determine the second location of the user device; determine when the second location of the user device is within the second area proximate to the controlled area; and transmit a third signal to the user device when the second location of the user device is within the second area proximate to the controlled area, wherein the user device is configured to transmit the second signal to the access device in response to receiving the third signal.

Example 27

The system of Example 21, wherein the user device is further configured to: determine the second location of the user device; and determine when the second location of the user device is within the second area proximate to the controlled area.

Example 28

The system of Example 21, wherein the controlled area is a guest room at the place of hospitality.

Example 29

The system of Example 21, wherein determining when the first location of the user device is within the first area proximate to the controlled area comprises: determining a distance between the first location of the user device and the controlled area; and determining when the distance is less than a predefined value, the predefined value associated with the first area proximate to the controlled area.

Example 30

The system of Example 21, wherein determining when the first location of the user device is within the first area proximate to the controlled area comprises: accessing a virtual map of the place of hospitality, the virtual map comprising one or more geofences defining a boundary of the first area proximate to the controlled area; and determining when the first location of the user device is disposed within the one or more geofences.

Example 31

The system of Example 21, wherein determining when the first location of the user device is within the first area proximate to the controlled area comprises: receiving a second signal from a sensor located at a critical point in the place of hospitality, the sensor configured to transmit the second signal when the sensor detects the user device.

Example 32

The system of Example 31, wherein the critical point is at least one of: an ingress point, an egress point, and a pivot point.

Example 33

The system of Example 21, wherein at least a portion of the second area is disposed more proximate to the controlled area than the first area.

Example 34

The system of Example 21, wherein the user device is at least one of: a tablet computer, and a mobile phone.

Example 35

The system of Example 21, wherein the user device is further configured to receive an input from the user, wherein the user device is configured to transmit the second signal to the access device when the second location of the user device is within the second area proximate to the controlled area and when the input from the user is received.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed example aspects. The exemplary systems and components described herein may be configured differently than described. For example, elements may be added to, removed from, or rearranged compared to the disclosed example aspects.

We claim:

1. A method for managing access devices at a place of hospitality, comprising:
   determining a first location of a device of a user;
   determining that the user is authorized access to a controlled area;
   determining that the first location of the device of the user is within a first area proximate to the controlled area; and
   transmitting, based on the determination that the first location of the user device is within the first area proximate to the controlled area, a first signal to an access device associated with the controlled area, wherein the first signal causes the access device to operate in a first power mode, wherein the first power mode enables the access device to receive a second signal, wherein the second signal causes the access device to allow access to the controlled area.

2. The method of claim 1, wherein the access device comprises an electronic radio-frequency identification lock system.

3. The method of claim 1, wherein the first location of the device of the user is determined based on at least one of: Global Positioning System data, cell tower data, Wi-Fi positioning data, Bluetooth positioning data, image data, and infrared sensor data.

4. The method of claim 1, wherein the access device is further configured to operate in a second power mode, and
   wherein the access device, operating in the first power mode, is configured to provide access to the controlled area in a shorter period of time than the access device operating in the second power mode.

5. The method of claim 1, wherein the access device is further configured to operate in a second power mode, and
   wherein the access device, operating in the first power mode, uses a greater amount of energy than the access device operating in the second power mode.

6. The method of claim 1, wherein the access device operating in the first power mode is configured to access a code for accessing the controlled area stored in the device of the user.

7. The method of claim 1, wherein determining that the user is authorized access to the controlled area at the place of hospitality comprises:
   accessing reservation information for the place of hospitality;
   determining, based on the reservation information, that the user has a reservation at the place of hospitality; and
   determining a controlled area at the place of hospitality to which the reservation of the user authorizes access.

8. The method of claim 1, wherein determining that the first location of the device of the user is within the first area proximate to the controlled area comprises:
   determining a distance between the first location of the device of the user and the controlled area; and
   determining that the distance is less than a predefined value, wherein the predefined value is associated with the first area proximate to the controlled area.

9. The method of claim 1, wherein determining that the first location of the device of the user is within the first area proximate to the controlled area comprises:
   accessing a virtual map of the place of hospitality, the virtual map comprising one or more geofences defining a boundary of the first area proximate to the controlled area; and
   determining that the first location of the device of the user is within the one or more geofences.

10. The method of claim 1, wherein determining that the first location of the device of the user is within the first area proximate to the controlled area comprises:
    receiving a second signal from a sensor located at a critical point in the place of hospitality, the sensor configured to transmit the second signal based on a detection of the device of the user.

11. The method of claim 10, wherein the critical point comprises at least one of: an ingress point, an egress point, and a pivot point.

12. The method of claim 1, further comprising:
    determining a second location of the device of the user;
    determining that the second location of the device of the user is within a second area proximate to the controlled area; and
    transmitting, based on the determination that the second location of the device of the user is within the second area, a third signal to the access device associated with the controlled area, wherein the third signal causes the access device to enable access to the controlled area.

13. The method of claim 12, wherein at least a portion of the second area is more proximate to the controlled area than the first area.

14. A device for providing access to a controlled area at a place of hospitality, comprising:
a processor; and
a memory storing instructions that, when executed, cause the processor to:
  determine a location of a device of a user, wherein the user is authorized access to the controlled area;
  determine that the location of the device of the user is within a predetermined distance from the controlled area; and
    transmit, based on the determination that the location of the device of the user is within the predetermined distance from the controlled area, a first signal to an access device associated with the controlled area, wherein the first signal causes the access device to operate in a first power mode, wherein the first power mode enables the access device to receive a second signal, wherein the second signal causes the access device to allow access to the controlled area.

15. The device of claim 14, wherein the device comprises at least one of: a tablet computer, and a mobile phone.

16. The device of claim 14, further comprising a receiver configured to receive an input from the user, and wherein the instructions, when executed, cause the processor to transmit the first signal to the access device further based on receiving the input from the user.

17. The device of claim 14, wherein the memory further stores a code for accessing the controlled area, wherein the first signal comprises the code for accessing the controlled area.

18. A system for providing access to a controlled area at a place of hospitality, comprising:
an access device configured to control access to the controlled area based on a determination that a user device is located within a first distance from the controlled area, wherein the determination is based on a first signal received from the user device;
an access management device in communication with the access device, comprising a wherein the access management device is configured to:
  determine a location of the user device;
  determine that a user associated with the user device is authorized access to the controlled area;
  determine that the location of the user device is located within a second distance from the controlled area; and
  transmit, based on the determination that the location of the user device is within the second distance from the controlled area, a second signal to the access device, wherein the second signal causes the access device to operate in a power mode.

19. The system of claim 18, wherein the power mode enables the access device to receive the first signal.

* * * * *